United States Patent Office 2,834,787
Patented May 13, 1958

2,834,787
PYRIDINE-3-ALDEHYDE ACETALS

Adolf Christian Josef Opfermann, Bergisch-Gladbach, Germany

No Drawing. Application July 24, 1956
Serial No. 599,690

Claims priority, application Germany August 3, 1955

1 Claim. (Cl. 260—297)

My invention relates to pyridine-3-aldehyde acetals.

I have found that the acetals derived from a pyridine-3-aldehyde which may be substituted and an alcohol containing 1–10 carbon atoms in the molecule have the effect of strongly dilating blood-vessels and can be used for treating rheumatic complaints. The products can be applied externally i. e. on the skin, preferably in the form of dilute solutions of the acetal in an alcohol. The concentration of the solutions may vary between about 0.1–0.3%. Products like iodine or camphor may be added to the solutions. The acetals in question can also be applied internally. In this case the concentration of the solutions to be used should not be higher than about 0.1% and preferably between about 0.05 and 0.1%.

The pyridine-3-aldehyde-acetals in question are obtainable by known processes. For example a pyridine-3-aldehyde may be reacted with an alcohol containing 1–10 carbon atoms in the molecule or with a corresponding orthoester, preferably in the presence of a catalyst such as hydrogen chloride or ferric chloride. As starting materials for preparing the acetals in question one may use paraffinic, olefinic, cycloparaffinic, cycloolefinic, araliphatic or heterocyclic alcohols containing 1–10 carbon atoms in the molecule. According to a preferred form of my invention an aliphatic monovalent alcohol containing 1–10 carbon atoms in the molecule is used as starting material. As aldehyde one may use pyridine-3-aldehyde or a substituted pyridine-3-aldehyde. The substituents are preferably members of the group consisting of the halogens, the alkyl-groups containing 1–3 carbon atoms in the molecule, the hydroxy- and the alkoxy groups, the aldehyde- and the carboxylic acid group.

The following examples serve to illustrate my invention without limiting it thereto.

*Example 1*

1 g. mol. of pyridine-3-aldehyde is mixed with 2–3 mols of absolute methanol and 1.5 mols of orthosilicic acid methyl ester and dry hydrogen chloride is introduced for 5 minutes at room temperature. The mixture is then boiled for 4 to 5 hours under reflux. The reaction liquid is worked up by vacuum distillation. Pyridine-3-aldehyde-dimethylacetal is then obtained with almost a theoretical yield.

*Example 2*

1 g. mol. of pyridine-3-aldehyde is mixed with 4 mols of absolute methanol and dry hydrogen chloride is introduced for 10 minutes. The mixture is then boiled for 5 to 6 hours under reflux. The reaction liquid is worked up by vacuum distillation. In this case, pyridine-3-aldehyde-dimethylacetal is obtained with a good yield.

*Example 3*

1 g. mol. of pyridine-3-aldehyde is mixed with 2 to 3 mols of absolute methanol and 1.5 mols of orthosilicic acid benzyl ester and dry hydrogen chloride is introduced for 5 minutes at room temperature. The mixture is then boiled for 4 to 5 hours under reflux. The reaction liquid is worked up by vacuum distillation. A good yield of pyridine-3-aldehyde dibenzylacetal is then obtained.

*Example 4*

1 g. mol. of pyridine-3-aldehyde is mixed with 2 to 3 mols of absolute ethanol and 1.5 mols of orthosilicic acid tetraethyl ester and dry hydrogen chloride is introduced for about 5 minutes at room temperature. The mixture is then boiled under reflux for 4 to 5 hours. After cooling, the reaction liquid is worked up by vacuum distillation. In this example, a good yield of pyridine-3-aldehyde diethylacetal is obtained (B. $P._{11}=105°$ C.).

*Example 5*

25 g. of pyridine-3-aldehyde are mixed with 430 g. of benzyl alcohol and dry hydrogen chloride is introduced for 15–20 minutes at room temperature. The mixture is then boiled for 4 to 5 hours under reflux. After cooling, the reaction liquid is worked up by vacuum distillation. In this example, there is obtained a good yield of pyridine-3-aldehyde dibenzylacetal (B. $P._2=108$–$112°$ C.).

*Example 6*

25 g. of pyridine-3-aldehyde are mixed with 420 g. of menthol and dry hydrogen chloride is introduced for 15 to 20 minutes at room temperature. The mixture is then boiled for 4 to 5 hours under reflux. After cooling, the reaction liquid is worked up by vacuum distillation. In this example, there is obtained a good yield of pyridine-3-aldehyde dibenzylacetal (B. $P._{1.5}=175$–$178°$ C.).

In an analogous way the following acetals of pyridine-3-aldehyde are obtainable:

Diallylacetal (B. $P._{13}=135$–$140°$ C.)
Diisopropylacetal (B. $P._{11}=120$–$125°$ C.)
Dibutylacetal (B. $P._{11}=158$–$160°$ C.)
Diisobutylacetal (B. $P._{11}=146$–$148°$ C.)

*Example 7*

50 g. of pyridine-3-aldehyde are mixed with 250 g. of ethyleneglycol. The reaction mixture is treated and worked up as described in Examples 1–6. The pyridine-3-aldehyde ethyleneglycolacetal is obtained in good yield (B. $P._{10}=150°$ C.).

*Example 8*

40 g. of the hydrochloride of pyridine-3-aldehyde are mixed with 270 g. of glycerol and 8 g. dry hydrogen chloride are introduced into the reaction mixture at room temperature. The mixture is slowly heated to 100° C. and kept at this temperature for 4–5 hours. The reaction mixture is allowed to stand at room temperature for 3 days and is worked up by vacuum distillation. A good yield of pyridine-3-aldehyde glycerolacetal is obtained (B. $P._{10}=210°$ C.).

*Example 9*

40 g. of the hydrochloride of pyridine-3-aldehyde are mixed with 250 g. of β-chloroethanol. 7.5 g. of hydrogen chloride are introduced into the reaction mixture. The reaction mixture is heated to 100° C., kept at this temperature for 4 hours, kept at room temperature for further 3 days, subjected to a vacuum distillation, until a sirupy consistency is obtained, and treated with the quantity of caustic sode being necessary to neutralize the hydrogen chloride contained in the reaction mixture. By vacuum distillation a good yield of pyridine-3-aldehyde-β-chloroethylacetal is obtained.

What I claim is:

As a new product pyridine-3-aldehyde-dimethylacetal.

References Cited in the file of this patent

Harries et al.: Liebig's Ann., vol. 410, pages 104–5, 115–6 (1915).